(12) United States Patent
Akenine-Moller et al.

(10) Patent No.: US 11,756,258 B2
(45) Date of Patent: *Sep. 12, 2023

(54) TECHNIQUES FOR RAY CONE TRACING AND TEXTURE FILTERING

(71) Applicant: NVIDIA CORPORATION, Santa Clara, CA (US)

(72) Inventors: Tomas Akenine-Moller, Lund (SE); Jakub Boksansky, Munich (DE); Oli Wright, Northwich (GB)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,378

(22) Filed: Sep. 7, 2022

(65) Prior Publication Data

US 2023/0005210 A1 Jan. 5, 2023

Related U.S. Application Data

(63) Continuation of application No. 17/039,574, filed on Sep. 30, 2020, now Pat. No. 11,443,475.

(60) Provisional application No. 63/030,162, filed on May 26, 2020, provisional application No. 63/022,033, filed on May 8, 2020.

(51) Int. Cl.
| | |
|---|---|
| *G06T 15/06* | (2011.01) |
| *G06T 1/20* | (2006.01) |
| *G06T 3/40* | (2006.01) |
| *G06T 15/00* | (2011.01) |
| *G06T 15/04* | (2011.01) |
| *G06T 15/10* | (2011.01) |

(52) U.S. Cl.
CPC ............... *G06T 15/06* (2013.01); *G06T 1/20* (2013.01); *G06T 3/40* (2013.01); *G06T 15/005* (2013.01); *G06T 15/04* (2013.01); *G06T 15/10* (2013.01)

(58) Field of Classification Search
CPC ....... G06T 15/06; G06T 15/005; G06T 15/04; G06T 15/10; G06T 3/40; G06T 1/20
See application file for complete search history.

(56) References Cited

U.S. PATENT DOCUMENTS

| | | |
|---|---|---|
| 10,460,504 B2 | 10/2019 | Akenine-Moller et al. |
| 10,600,232 B2 | 3/2020 | Akenine-Moller et al. |
| 2005/0243082 A1 * | 11/2005 | Christensen ............ G06T 15/06 345/418 |

(Continued)

OTHER PUBLICATIONS

Amanatides et al., "Ray Tracing with Cones", Computer Graphics {SIGGRAPH), vol. 18, No. 3, Jul. 1984, pp. 129-135.

(Continued)

*Primary Examiner* — Michelle Chin
(74) *Attorney, Agent, or Firm* — Artegis Law Group, LLP

(57) ABSTRACT

One embodiment of a method for computing a texture color includes tracing a ray cone through a graphics scene, determining a curvature of a first surface within the graphics scene at a point where the ray cone hits the first surface based on differential barycentric coordinates associated with the point, determining, based on the curvature of the first surface, a width of the ray cone at a subsequent point where the ray cone hits a second surface within the graphics scene, and computing a texture color based on the width of the ray cone.

20 Claims, 7 Drawing Sheets

(56) References Cited

U.S. PATENT DOCUMENTS

| | | | |
|---|---|---|---|
| 2009/0167763 A1* | 7/2009 | Waechter | G06T 15/40 345/426 |
| 2009/0219286 A1* | 9/2009 | Wei | G06T 15/005 345/424 |
| 2013/0328875 A1 | 12/2013 | Burley et al. | |
| 2017/0206700 A1 | 7/2017 | Munkberg et al. | |
| 2019/0318526 A1 | 10/2019 | Hunt et al. | |

OTHER PUBLICATIONS

Akenine-Moller et al., "Texture Level-of-Detail Strategies for Real-Time Ray Tracing", In Ray Tracing Gems, Chapter 20, NVIDIA, https://doi.org/10.1007/978-1-4842-4427-2_20, 2019, pp. 321-345.

Burley et al., "The Design and Evolution of Disney's Hyperion Renderer", ACM Transactions on Graphics, vol. 37, No. 3, Article 33, https://doi.org/10.1145/3182159, Jul. 2018, pp. 33:1-33:22.

Boksansky et al., "Minecraft with RTX: Crafting a Real-Time Path Tracer for Gaming", NVIDIA Developer, In GTC Digital talk (2020), Retrieved from https://developer.nvidia.com/gtc/2020/video/s22678-vid, on Sep. 2, 2021, 2 pages.

Benty et al., "The Falcor Rendering Framework", GitHub—NVIDIAGameWorks, Retrieved from https://github.com/NVIDIAGameWorks/Falcor, on Sep. 2, 2021, 4 pages.

He et al., "Slang: Language Mechanisms for Extensible Real-Time Shading Systems", ACM Transactions on Graphics vol. 37, No. 4, Article 141, https://doi.org/10.1145/3197517.3201380, Aug. 2018, pp. 141:1-141:13.

He et al., "A System for Rapid, Automatic Shader Level-of-Detail", ACM Transactions on Graphics, vol. 34, No. 6, Article 187, DOI: http://doi.acm.org/10.1145/2816795.2818104, Nov. 2015, pp. 187:1-187:12.

Igehy, Homan, "Tracing Ray Differentials", In Proceedings of SIGGRAPH'99, 1999, pp. 179-186.

Pharr, Matt, "Swallowing the Elephant (Part 5)", In Matt Pharr's blog (2018), Retrieved from https://pharr.org/matt/blog/2018/07/16/moana-island-pbrt-5.html, on Sep. 2, 2021, Jul. 16, 2018, 6 pages.

Strom et al., "Immersive Linear Algebra", 1.1 ed. 2020, Retrieved from http://immersivemath.com/ila/ch01_introduction/ch01.html, on Sep. 6, 2021, 2020, 4 pages.

Schilling et al., "Texram: A Smart Memory for Texturing", IEEE Computer Graphics and Applications, vol. 16, No. 3, May 1996, pp. 32-41.

Williams, Lance, "Pyramidal Parametrics", Computer Graphics, (SIGGRAPH), vol. 17, No. 3, Jul. 1983, pp. 1-11.

* cited by examiner

TECHNIQUES FOR RAY CONE TRACING AND TEXTURE FILTERING

CROSS-REFERENCE TO RELATED APPLICATIONS

This application is a continuation of the application titled, "TECHNIQUES FOR RAY CONE TRACING AND TEXTURE FILTERING," filed on Sep. 30, 2020 and having Ser. No. 17/039,574, which claims the priority benefit of United States provisional patent application titled "TEXTURE FILTERING TECHNIQUES FOR RAY TRACING," filed on May 26, 2020, and having Ser. No. 63/030,162, and also claims the priority benefit of United States provisional patent application titled, "TEXTURE FILTERING TECHNIQUES FOR RAY TRACING," filed on May 8, 2020, and having Ser. No. 63/022,033. The subject matter of these related applications is hereby incorporated herein by reference.

BACKGROUND

Technical Field

Embodiments of the present disclosure relate generally to computer science and computer graphics and, more specifically, to techniques for ray cone tracing and texture filtering.

Description of the Related Art

In three-dimensional (3D) computer graphics, ray tracing is a popular technique for rendering images, such as the frames of a movie or video game. Ray tracing techniques trace the path of light rays and simulate the effects of the light rays interacting with virtual objects within a virtual scene. Ray cone tracing techniques are similar to ray tracing techniques, except ray cone tracing techniques trace cones through a scene. Ray cone tracing techniques can solve various sampling and aliasing problems that affect ray tracing techniques.

One approach for implementing ray cone tracing uses an initial G-buffer rasterizing pass to determine and store surface spread angles, which represent curvatures on the surfaces of objects within a scene and are used to determine how ray cones grow and shrink while being traced through the scene. However, G-buffer rasterizing passes are quite expensive in terms of both the computational and storage resources required to determine and store the surface spread angles.

In addition, conventional ray cone tracing techniques compute mipmap sampling levels separately for multiple textures with different sizes. Mipmaps are pre-calculated images at different "levels," which are progressively lower resolution representations of the same image. As a general matter, separately computing mipmap sampling levels, according to conventional ray cone tracing techniques, is computationally expensive.

As the foregoing illustrates, what is needed in the art are more effective techniques for rendering graphics scenes using ray cone tracing.

SUMMARY

One embodiment of the present disclosure sets forth a computer-implemented method for computing a texture color. The method includes tracing a ray cone through a graphics scene. The method also includes determining a curvature of a first surface within the graphics scene at a point where the ray cone hits the first surface based on differential barycentric coordinates associated with the point. The method further includes determining, based on the curvature of the first surface, a width of the ray cone at a subsequent point where the ray cone hits a second surface within the graphics scene. In addition, the method includes computing a texture color based on the width of the ray cone.

Another embodiment of the present disclosure sets forth a computer-implemented method for computing a texture color. The method includes determining a set of differential barycentric coordinates associated with a hit point at which a ray cone intersects a first surface within a graphics scene. The method also includes determining a first surface spread angle associated with the hit point based on the set of differential barycentric coordinates, and determining, based on the first surface spread angle, a width of the ray cone at a subsequent hit point where the ray cone intersects a second surface within the graphics scene. The method further includes determining a first level-of-detail parameter value based on the width of the ray cone, and performing one or more texture filtering operations based on the first level-of-detail parameter value. In addition, the method includes computing a texture color based on results of the one or more texture filtering operations.

Other embodiments of the present disclosure include, without limitation, one or more computer-readable media including instructions for performing one or more aspects of the disclosed techniques as well as one or more computing systems for performing one or more aspects of the disclosed techniques.

At least one technological advantage of the disclosed techniques relative to the prior art is that differential normals used to determine a mipmap sampling level are determined without requiring a separate G-buffer rasterizing pass. As a result, the disclosed techniques are faster and require less storage space than conventional ray cone tracing techniques. Further, techniques are disclosed for determining surface spread angles that produce more correctly rendered images than surface spread angles determined using conventional techniques. In addition, the disclosed techniques permit mipmap sampling levels for multiple textures with different resolutions to be determined more efficiently than conventional ray cone tracing techniques. These technological advantages represent one or more technological advancements relative to prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
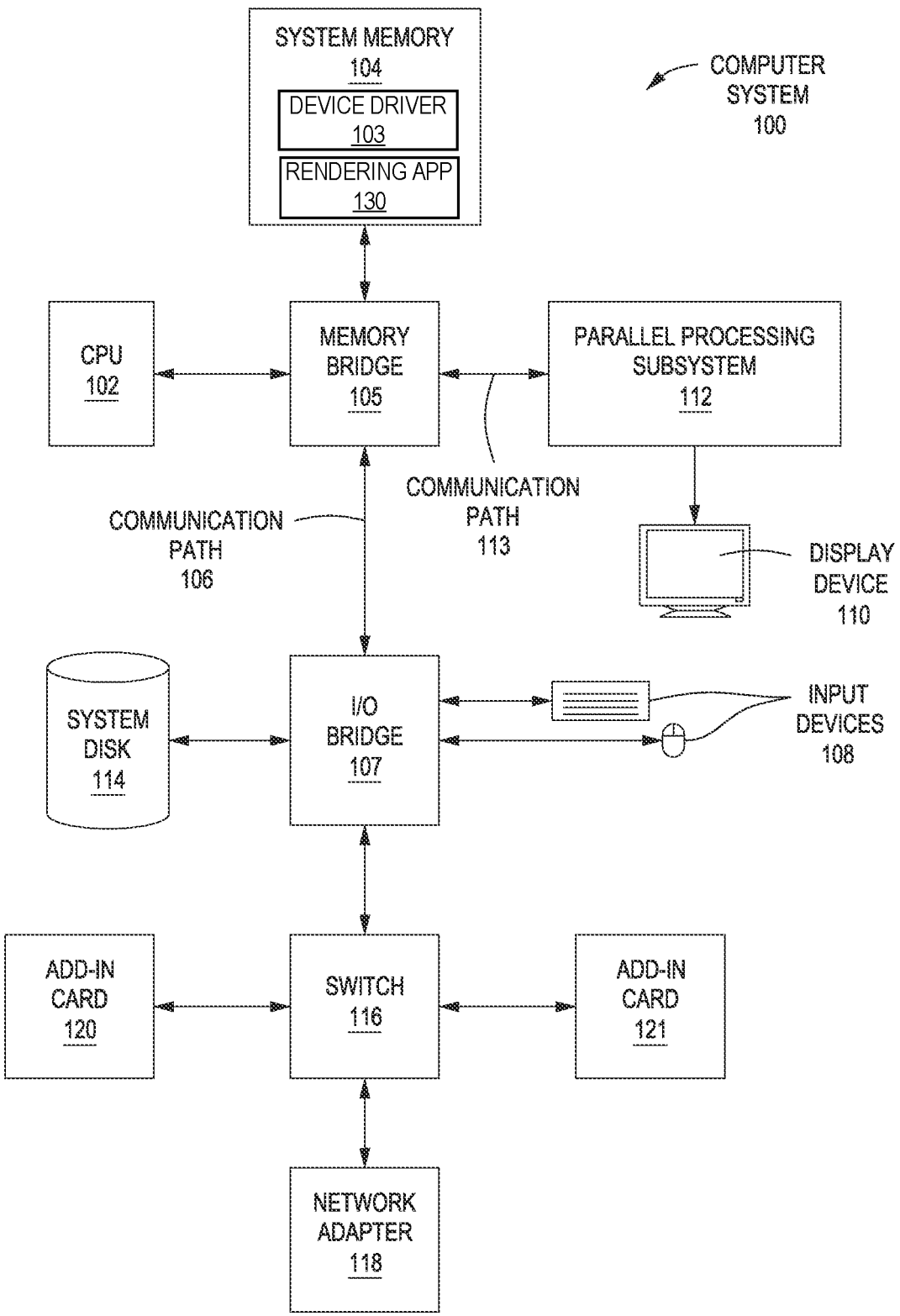
FIG. 1 is a block diagram illustrating a computer system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved ray cone tracing techniques for texture filtering. The improved ray cone tracing techniques have many real-world applications, including video games, film production rendering, architectural and design applications, and any other applications in which images can be rendered using ray cone tracing. In the improved ray cone tracing techniques, when a ray cone being traced through a virtual three-dimensional (3D) scene hits a surface within the scene, a curvature of the surface is determined based on differential barycentric coordinates. The curvature of the surface is then used to determine a width of the ray cone when the ray cone hits another surface within the scene. In turn, the width of the ray cone is used to determine a texture color that can be applied to the pixel of an image being rendered.

Various techniques are disclosed for determining the curvature of the surface at the point where the ray cone hits the surface. In general, the curvature of the surface is determined based on differential normals associated with the surface at the point, which are themselves determined based on differential barycentric coordinates. Further, the curvature of the surface can be determined as the larger of the absolute value of two curvatures along different dimensions, among other things. In addition, if the surface is associated with multiple textures with different resolutions, then a parameter value that is independent of resolution, as well as a parameter value that is dependent on resolution, can be determined.

The ray cone tracing techniques of the present disclosure have many real-world applications. For example, the ray cone tracing techniques can be used to efficiently render images and/or frames within a video game. In particular, the disclosed ray cone tracing techniques require less storage space and produce more correctly-rendered images than conventional ray cone tracing techniques. The rendered images and/or frames may also appear more lifelike than images and/or frames rendered using some other rendering techniques, such as rasterization.

As another example, the ray cone tracing techniques can be used in the production-quality rendering of films. The production of animated films as well computer-generated imagery (CGI) and special effects within live action films, often requires high-quality rendering of frames of those films. The disclosed ray cone tracing techniques can be used to render the frames of a film more efficiently and correctly than some other techniques, such as conventional ray cone tracing techniques.

As yet another example, the disclosed ray cone tracing techniques can be used to render the designs of architectural structures and other objects. Architectural and design applications oftentimes provide renderings to show how particular designs would look in real life. The disclosed ray cone tracing techniques can be used to more efficiently and correctly render images of designs than some other techniques, such as conventional ray cone tracing techniques.

The above examples are not in any way intended to be limiting. As persons skilled in the art will appreciate, as a general matter, the ray cone tracing techniques described herein can be implemented in any application where convention ray tracing and/or ray cone tracing techniques are currently employed.

System Overview

FIG. 1 is a block diagram illustrating a computer system 100 configured to implement one or more aspects of the present embodiments. As persons skilled in the art will appreciate, computer system 100 can be any type of technically feasible computer system, including, without limitation, a server machine, a server platform, a desktop machine, laptop machine, or a hand-held/mobile device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130. The rendering application 130 can be any technically-feasible application that renders virtual 3D scenes using ray cone tracing techniques disclosed herein. For example, the rendering application 130 could be a gaming application or a rendering application that is used in film production. Although described herein primarily with respect to the rendering application 130, techniques disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
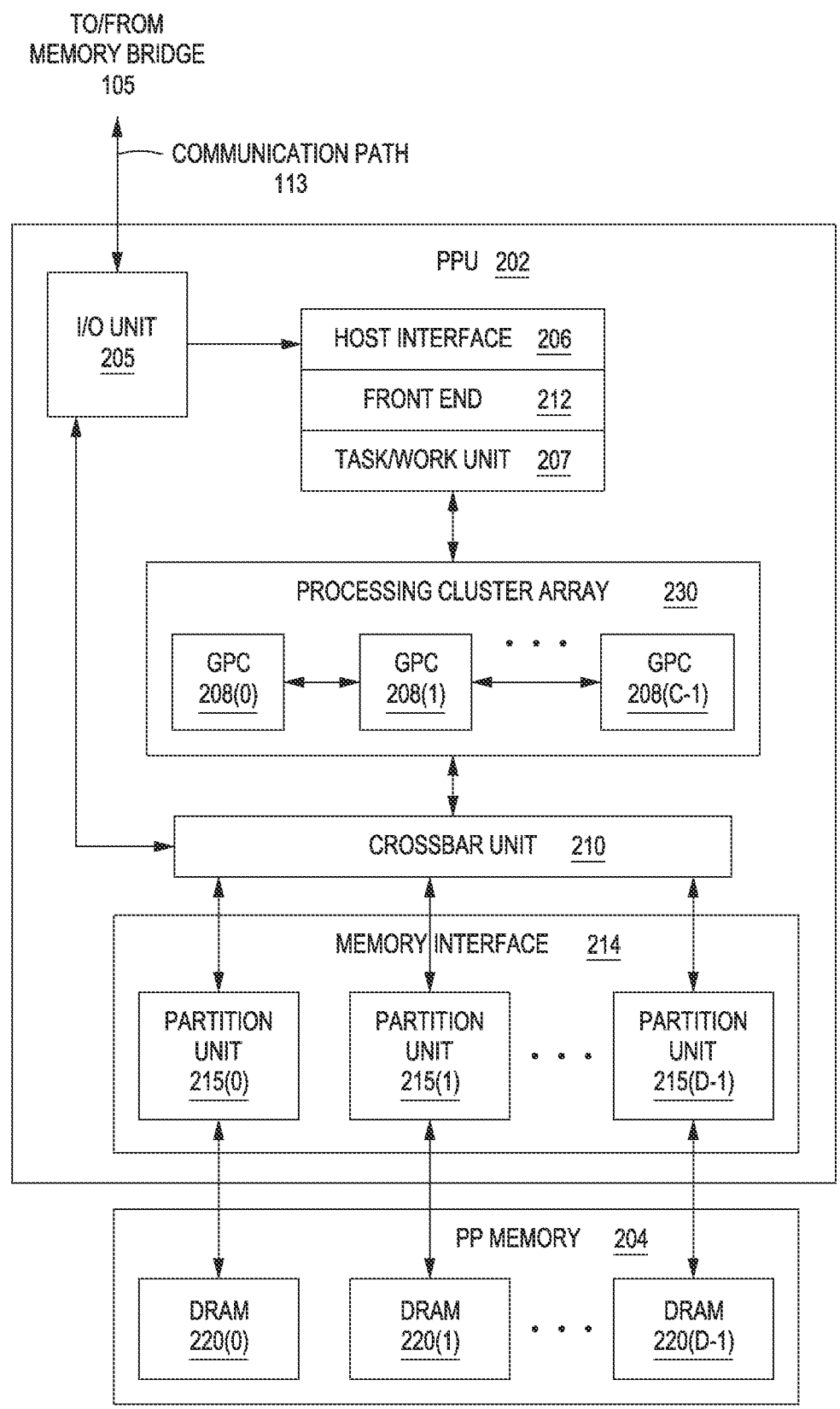
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
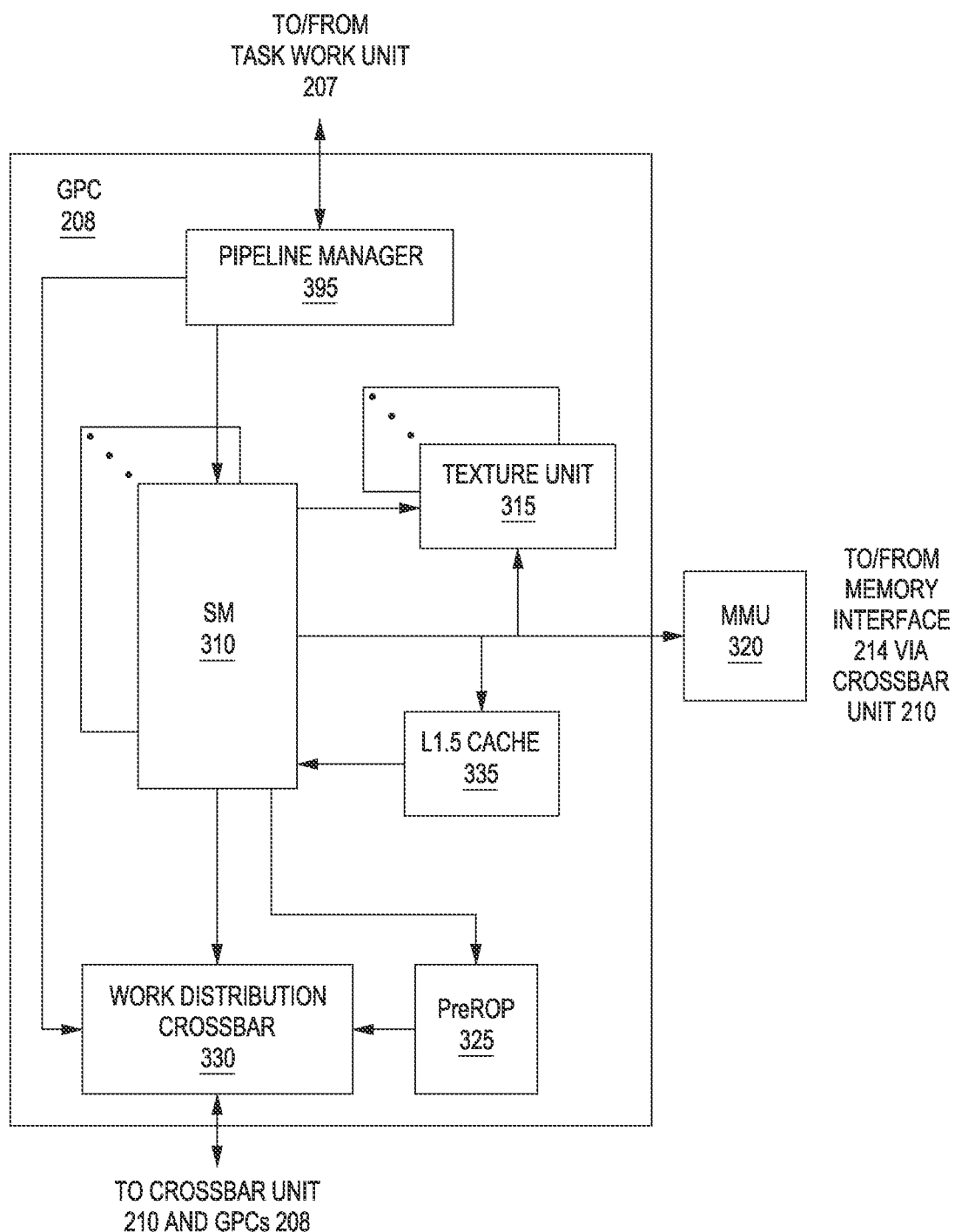
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 50R), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Ray Cone Tracing and Texture Filtering Techniques

Figure 4:
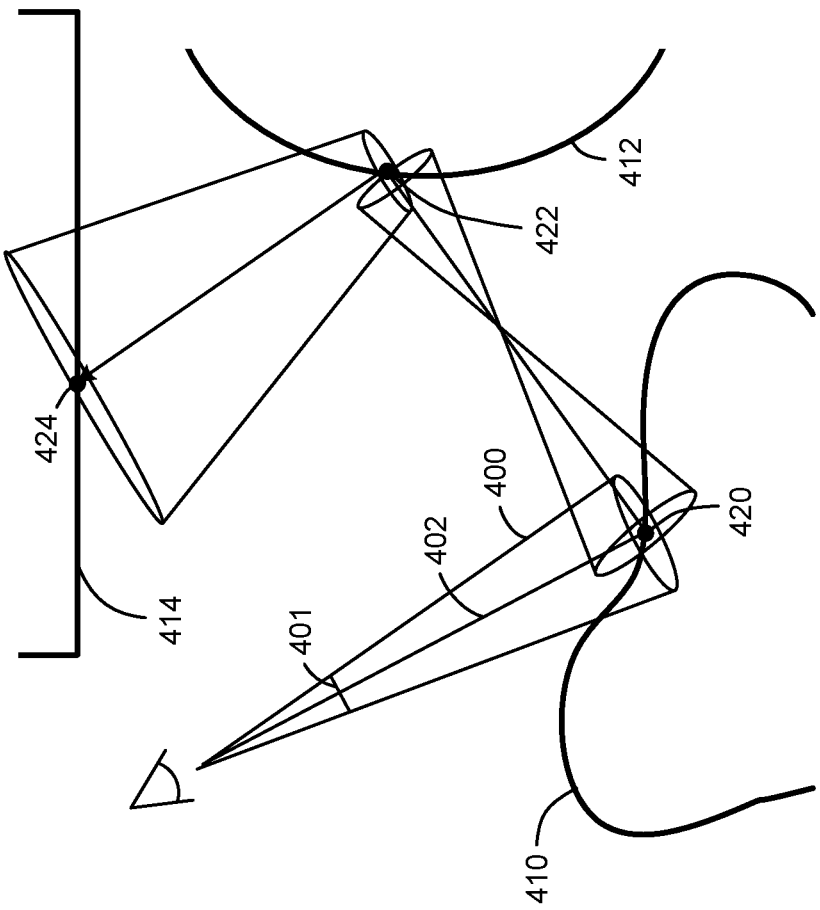
FIG. 4 illustrates an exemplary ray cone being traced through a virtual three-dimensional scene, according to various embodiments.

FIG. 4 illustrates an exemplary ray cone being traced through a virtual three-dimensional scene, according to various embodiments. As shown, a ray cone 400, which is an augmentation to a ray 402, is traced through a pixel 401 in a screen space into a scene that includes three objects 410, 412, and 414. When the ray cone 400 hits one of the objects 410, 412, 414, the ray cone 400 reflects off in a direction, depending on material properties of the object. In addition, an angle of the ray cone 402 grows or shrinks (or stays the same) based on the surface curvature of the object. In general, the angle of the ray cone 400 grows if the surface curvature at a hit point where the ray 402 intersects geometry of the object is convex, and vice versa.

Figure 5:
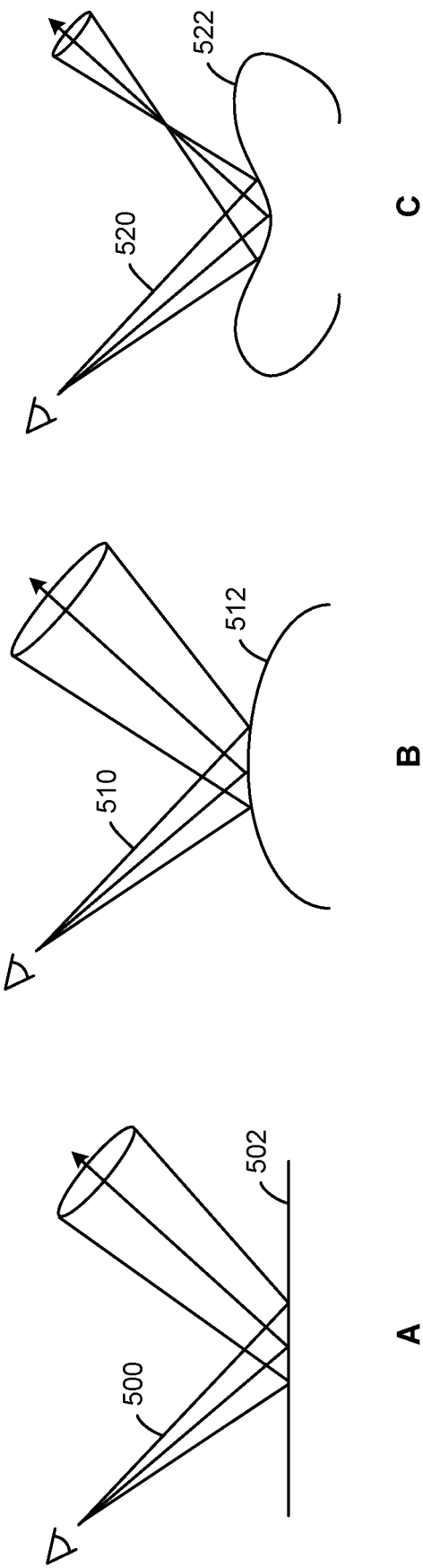
FIG. 5 illustrates exemplary reflection interactions at different types of surface geometry, according to various embodiments.

FIG. 5 illustrates exemplary reflection interactions at different types of surface geometry, according to various embodiments. In embodiments, a surface spread angle β is used to model how a ray cone footprint grows/shrinks due to the curvature of a surface at a hit point. Intuitively, the surface spread angle β models the extra spread induced by the curvature at a hit point. As described in greater detail below, the surface spread angle can be used to estimate the width of a ray cone at a later hit point, which can correspond to the size of a filter used during texture filtering. Texture filtering techniques determine the texture color of a texture mapped pixel by averaging nearby pixels in a texture. The texture color can then be used to determine a pixel color in a rendered image. When a ray cone hits a textured surface (as opposed to a metallic surface with no texture) in a scene, texture filtering can be performed by averaging nearby pixels within a width of the ray cone at the hit point. The averaging can be performed using, e.g., mipmapping.

As shown in panel A, at a planar surface 502 with no curvature, an angle of a ray cone 500 neither grows nor shrinks in size when the ray cone 500 reflects at a hit point on the planar surface 502. In such a case, the surface spread angle β is zero.

As shown in panel B, at a convex surface 512 with positive curvature, an angle of a ray cone 510 increases in size when the ray cone 510 reflects at a hit point on the convex surface 512. In such a case, the surface spread angle β is >0.

As shown in panel C, at a concave surface 522 with negative curvature, an angle of a ray cone 520 decreases in size when the ray cone 520 reflects at a hit point on the concave surface. In such a case, the surface spread angle β is <0.

Returning to FIG. 4, an angle of the ray cone 400 shrinks after hitting the object 410, because the surface curvature at the hit point 420 is negative. After shrinking to zero size, the ray cone 400 grows in size again. Then, the angle of ray cone 400 grows after the ray cone 400 hits the object 412, because the surface curvature at the hit point 422 is convex.

Assuming the rectangular object 414 is textured and the other objects 410 and 412 are perfectly reflective, a texture lookup can be performed at the hit point 424 on the object 414 based on the footprint of the cone 400 and the normal at the hit point 424. Although described with respect to a texture lookup at the hit point 424 as an example, texture lookups can generally be performed at a second hit point (e.g., hit point 422) and all hit points thereafter. In some embodiments, the rendering application 130 instructs a texture unit in a GPU (q, the texture unit 315 described above in conjunction with FIG. 3) to perform texture filtering at a hit point (e.g., the hit point 424) based on a mipmap level determined using the width of the ray cone at the hit point, and a result of the texture filtering is used to render a textured reflection on the leftmost object 410, as described in greater detail below. Although described herein primarily with respect to a mipmap, the ray cone can be used with other texture filtering techniques, such as anisotropic filtering, in some embodiments. The surface spread angles at the hit points 420 and 422 at which the ray cone 400 reflects off of the objects 410 and 412, respectively, can be used to compute how much the ray cone 400 grows or shrinks, and to determine the width of the ray cone at the hit point 424, which is also referred to as the "footprint" of the ray cone and is used in texture filtering to determine a texture color. In some embodiments, the rendering application 130 determines the surface spread angle at a hit point by determining differential normals using differential barycentric coordinates at the hit point, and then determining the surface spread angle based on the differential normals, as described in greater detail below in conjunction with FIG. 6. By determining differential normals on the fly, the G-buffer rasterization pass used to compute and store surface spread angles in conventional ray cone tracing techniques can be avoided, thereby improving computational efficiency.

Figure 6:
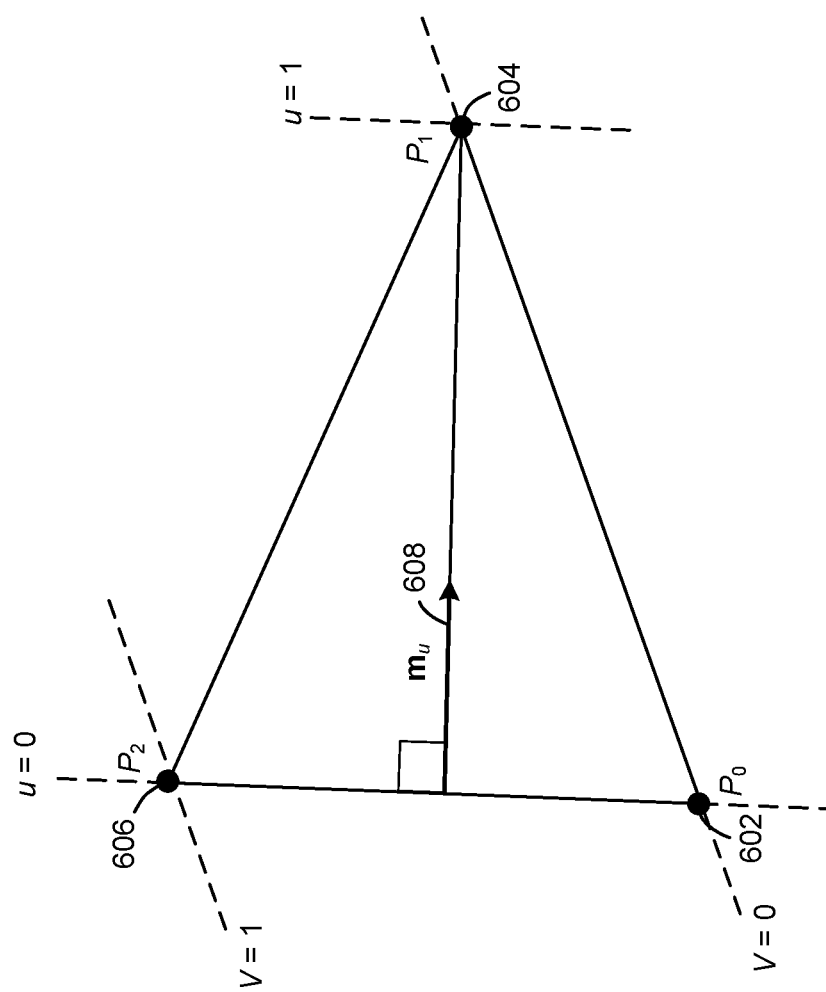
FIG. 6 illustrates an approach for determining differential barycentric coordinates, according to various embodiments.

FIG. 6 illustrates an approach for determining differential barycentric coordinates, according to various embodiments. As shown, a triangle 600, which is shown to be representative of the triangle at which a ray associated with a ray cone intersects geometry of an object at a hit point (not shown), includes three vertices 602, 604, and 606. Barycentric coordinates (u, v) are also shown. As described, differential barycentric coordinates, which are the barycentric coordinates u and v differentiated with respect to x and y, are computed to determine differential normals, which can in turn be used to determine the surface spread angle at a hit point where a ray cone intersects scene geometry. Let the normal of the triangle 600 be denoted by f and the vertices 602, 604, and 606 be denoted by $P_0$, $P_1$, and $P_2$, respectively. Differential barycentric coordinates can be computed using plane equations that go through edges of the triangle 600 and evaluate to (1) zero for points on an edge, and (2) one for a vertex that is not an edge vertex.

Assume that a plane equation goes through $P_0$ and $P_1$, which as shown in connected to the barycentric coordinate u. Then, a normal 608, denoted as $m_u$, of the edge that is also perpendicular to the triangle normal f can be computed as:

$$m_u = (P_2 - P_0) \times f = e_2 \times f. \quad (1)$$

Similarly for the other barycentric coordinate v, a normal $m_v$ can be computed as:

$$m_v = (P_1 - P_0) \times f = e_1 \times f. \quad (2)$$

The plane equation is then $m_u \cdot (X - P_0) = 0$, where X is any point on the plane with normal $m_u$. The edge equation can rewritten as $e_u(X) = m_u \cdot (X - P_0)$, assuming the plane equation is normalized so that $e_u(P_1) = 1$, which can be obtained as $e'_u(X) = e_u(X)/e_u(P_1)$. Only a normal vector of the plane equation is needed for the foregoing computations, and the normal vector, denoted herein as $I_u$, is then:

$$I_u = \frac{1}{m_u \cdot (P_1 - P_0)} m_u = \frac{1}{m_u \cdot e_1} m_u. \quad (3)$$

Similarly for the other barycentric coordinate v, $I_v$ can be computed as:

$$I_v = \frac{1}{m_v \cdot (P_2 - P_0)} m_v = \frac{1}{m_v \cdot e_2} m_v. \quad (4)$$

In addition, the triangle plane normal f can be computed as $f = e_1 \times e_2$, which does not need to be normalized, as the plane equations (3) and (4) are already normalized. A plane equation for the third barycentric coordinate w does not need to be computed. In particular, w=1−u−v, so the barycentric differential $$\frac{\partial w}{\partial x}$$

can be computed from barycentric differentials $$\frac{\partial u}{\partial x} \text{ and } \frac{\partial v}{\partial x} \text{ as } \frac{\partial w}{\partial x} = -\frac{\partial u}{\partial x} - \frac{\partial v}{\partial x}.$$

Using the plane equations $I_u$ and $I_v$ differential barycentric coordinates can be computed, from which differential normals can be computed, a surface spread angle can be computed using the differential normals, the width of the ray cone at a later hit point can be determined from the surface spread angle, and a mipmap sampling level, which is a level-of-detail parameter value, can be determined based on the width of the ray cone. As described, mipmaps include pre-calculated images at different levels, which are progressively lower resolution representations of the same image that can be obtained via low pass filtering. In some embodiments, the differential barycentric coordinates can be computed as:

$$\left(\frac{\partial u}{\partial x}, \frac{\partial v}{\partial x}, \frac{\partial u}{\partial y}, \frac{\partial v}{\partial y}\right) = \left(I_u \cdot \frac{\partial O'}{\partial x}, I_v \cdot \frac{\partial O'}{\partial x}, I_u \cdot \frac{\partial O'}{\partial y}, I_v \cdot \frac{\partial O'}{\partial y}\right). \quad (5)$$

The differential barycentric coordinates can be then used to calculate (non-normalized, which is indicated by the bar above n) differential normals and $$\frac{\partial \bar{n}}{\partial x} \text{ and } \frac{\partial \bar{n}}{\partial y}$$

at a hit point as:

$$\frac{\partial \bar{n}}{\partial x} = \frac{\partial u}{\partial x}(n_1 - n_0) + \frac{\partial v}{\partial x}(n_2 - n_0), \quad (6)$$

and similarly for $$\frac{\partial \bar{n}}{\partial y}.$$

In turn, the differential normals can be used to a determine a surface spread angle, without requiring a G-buffer rasterizing pass. Equation (6) comes from differentiating an interpolation of the vertex normals $n_i$. Given the barycentric coordinates (u, v), vertex normals $n_i$ can be interpolated as:

$$\bar{n} = (1-u-v)n_0 + un_1 + vn_2 = n_0 + u(n_1 - n_0) + v(n_2 - n_0), \quad (7)$$

where the bar above n is used to indicate that n is not normalized. The normalized normal $n = \bar{n}/\|\bar{n}\|$ can then be differentiated as $$\frac{\partial n}{\partial x} = \frac{(\bar{n} \cdot \bar{n})\frac{\partial \bar{n}}{\partial x} - \left(\bar{n} \cdot \frac{\partial \bar{n}}{\partial x}\right)\bar{n}}{(\bar{n} \cdot \bar{n})^{3/2}} \quad (8)$$

with respect to the x-direction, and similarly for $$\frac{\partial n}{\partial y}$$

for the y-direction. In equation (8), $\bar{n}$ is from equation (7) and $$\frac{\partial \bar{n}}{\partial x}$$

can be computed, using the differential barycentric coordinates $$\left(\frac{\partial u}{\partial x}, \frac{\partial v}{\partial x}, \frac{\partial u}{\partial y}, \frac{\partial v}{\partial y}\right),$$

according to equation (6), and similarly for $$\frac{\partial \bar{n}}{\partial y}.$$

Given the differential normals of equation (6) at a hit point, the surface spread angle $\beta$ can be determined in various ways. In some embodiments, the surface spread angle $\beta$ can be determined as:

$$\beta = \begin{cases} \max(\beta_x, \beta_y), & \text{if } \beta_x \geq 0 \text{ and } \beta_y \geq 0 \\ \min(\beta_x, \beta_y), & \text{if } \beta_x < 0 \text{ and } \beta_y < 0, \\ \beta_x + \beta_y, & \text{otherwise} \end{cases} \quad (9)$$

where $\beta_x$ and $\beta_y$ are computed from the differential normals as:

$$\beta_x = \arctan\left(\left\|\frac{\partial n}{\partial x}\right\|\right) \text{sign}\left(r \cdot \frac{\partial n}{\partial x}\right),$$

$$\beta_y = -\arctan\left(\left\|\frac{\partial n}{\partial y}\right\|\right) \text{sign}\left(u \cdot \frac{\partial n}{\partial y}\right),$$

where (v, u, r) is the camera frame including the view direction v, the up vector u, and the right vector r, which is perpendicular to both v and u. The rationale behind the surface spread of equation (9) is to compute one angle per x and y. If the surface is convex, then both of the angles will be positive. On the other hand, if the surface is concave, then both angles will be negative. In such cases, the angle with the largest magnitude is used. Otherwise, if one angle is positive and the other angle is negative, which can occur on the surface of a hyperbolic paraboloid, then a sum of the angles is used. The intuition behind the sum is that if a surface point is "as much" convex as concave, then the sum will be zero and the behavior is that of a planar surface.

In other embodiments, the surface spread angle $\beta$ can be determined as:

$$\beta = \begin{cases} \beta_x, & \text{if } |\beta_x| \geq |\beta_y| \\ \beta_y & \text{otherwise} \end{cases} \quad (10)$$

The surface spread angle of equation (10) uses the largest angle $\beta_x$ or $\beta_y$, meaning that the curvature with the largest magnitude dictates the value of the surface spread angle $\beta$. Selecting the curvature with the largest magnitude ensures that texture filtering based on the surface spread angle is conservative, i.e., the texture filtering tends to produce more blurring than aliasing. Excessive blurring is generally preferable over excessive aliasing, which can produce noisy, flickering results.

In other embodiments, the surface spread angle $\beta$ can be determined as:

$$\beta = \frac{1}{2}(\beta_x + \beta_y). \quad (11)$$

The surface spread of equation (11) is an approximation of the mean curvature.

In other embodiments, the surface spread angle $\beta$ can be determined as:

$$\beta = 2\sqrt{\beta_x^2 + \beta_x^2} \cdot (|\beta_x| \geq |\beta_y|?\text{sign}(\beta_x):\text{sign}(\beta_y)). \quad (12)$$

The part of equation (12) inside the parenthesis causes the part to the left of the left parenthesis to be multiplied with the sign of $\beta_x$ if the absolute value of $\beta_x$ is greater than or equal to the absolute value of $\beta_y$, and otherwise the part to the left of the left parenthesis is multiplied by the sign of $\beta_y$.

As described, the rendering application 130 can use the surface spread angle $\beta$ to determine the width of the ray cone at a later hit point (e.g., the hit point 424), which can in turned be used to determine a mipmap sampling level, and the rendering application 130 can then instruct a texture unit in a GPU to perform texture filtering in which a mipmap is sampled at the sampling level. It should be understood that GPU implementations of texture filtering are well-known. For example, the GPU could perform bilinear interpolation in the closest mipmap level. As another example, the sampling level of the mipmap can be a non-integer that is between two levels, in which case the GPU may blend the bilinear filtering results from the two mipmap levels based on a fraction of the non-integer value determined using the width of the ray cone at the hit point.

More formally, let the mipmap sampling level be denoted by a parameter $\lambda$ It is well known that the parameter $\lambda$ for the $i^{th}$ hit point can be computed as:

$$\lambda_i = \Delta_i + \log_2 |W_i| - \log_2 |n_i \cdot d_i|, \quad (13)$$

where $\Delta_i$ is defined as:

$$\Delta_i = \frac{1}{2} \log_2 \left( \frac{t_a}{p_a} \right), \quad (14)$$

with $t_a = wh|(t_{1x}-t_{0x})(t_{2y}-t_{0y})-(t_{2x}-t_{0x})(t_{1y}-t_{0y})| = wht_t$, and $P_a = |(P_{1x}-P_{0x})(P_{2y}-P_{0y})-(P_{2x}-P_{0x})(P_{1y}-P_{0y})|$, where w×h is the texture resolution. In addition, the width of the ray cone at the $i^{th}$ hit point $W_i$ can be computed as:

$$W_i = W_{i-1} + \gamma_i t_i, \quad (15)$$

where $\gamma_i = \gamma_{i-1} + \beta_{i-1}$. Returning to the example of FIG. 4, the width of the ray cone 400 at the hit point 422 is $W_0 = \alpha t_0 = \gamma_0 t_0$, where a has been introduced as $a = y_0$; the width of the ray cone 400 at the hit point 424 is $W_1 = W_0 + y_1 t_0 = \alpha t_o + (\alpha + \beta_0) t_1$, where $\beta_0$ is the surface spread angle at the first hit point, etc.

In some embodiments, the rendering application 130 can use a modification to equation (14) that more efficiently handles multiple textures with different sizes, per triangle, which are also referred to herein as resolutions. For example, one texture could be a base color texture, another texture could be a specular color texture indicating shininess, another texture could be a normal map indicating how normals change over a surface, another texture could be an emissive texture, etc., and the multiple textures could have different resolutions. Equation (14) bakes the texture resolution w×h into $\Delta_i$, which is not ideal when multiple textures with different resolutions are applied to a triangle, because a separate mipmap sampling level parameter value $\lambda_i$, needs to be used per texture. However, equation (14) can be rewritten as:

$$\Delta_i = \frac{1}{2} \log_2 \left( \frac{t_a}{p_a} \right) = \frac{1}{2} \log \left( \frac{wht_t}{p_a} \right) = \frac{1}{2} \log_2 (wh) + \frac{1}{2} \log_2 \left( \frac{t_t}{p_a} \right). \quad (16)$$

In equation (16)

$$\frac{1}{2} \log_2 (wh)$$

is a texture resolution-dependent term that includes the width and height of the texture image, and $$\frac{1}{2} \log_2 \left( \frac{t_t}{p_a} \right)$$

is a texture resolution-independent term (although still dependent on texture coordinates). Further, rather than computing the mipmap sampling level parameter value $\lambda_i$, the rendering application 130 can first compute part of the mipmap sampling level parameter value $\Delta_{it}$ that is independent of texture resolution:

$$\lambda_{it} = \frac{1}{2} \log_2 \left( \frac{t_t}{p_a} \right) + \log_2 |W_i| - \log_2 |n_i \cdot d_i|, \quad (17)$$

which can be shared among all textures for a triangle. Then, just before a particular texture j is sampled, the rendering application 130 can compute the final $\lambda_{ij}$ for that texture as:

$$\lambda_{ij} = \lambda_{it} + \frac{1}{2} \log_2 (w_j h_j). \quad (18)$$

Referring generally to FIG. 4-6, persons skilled in the art will understand that the foregoing examples are presented for clarity and not meant to limit the scope of the present embodiments. As a general matter, any technically feasible approach to modifying or permuting graphics objects can be applied, and any technically feasible approach to detecting modified or permuted graphics objects can equally be applied.

Figure 7:
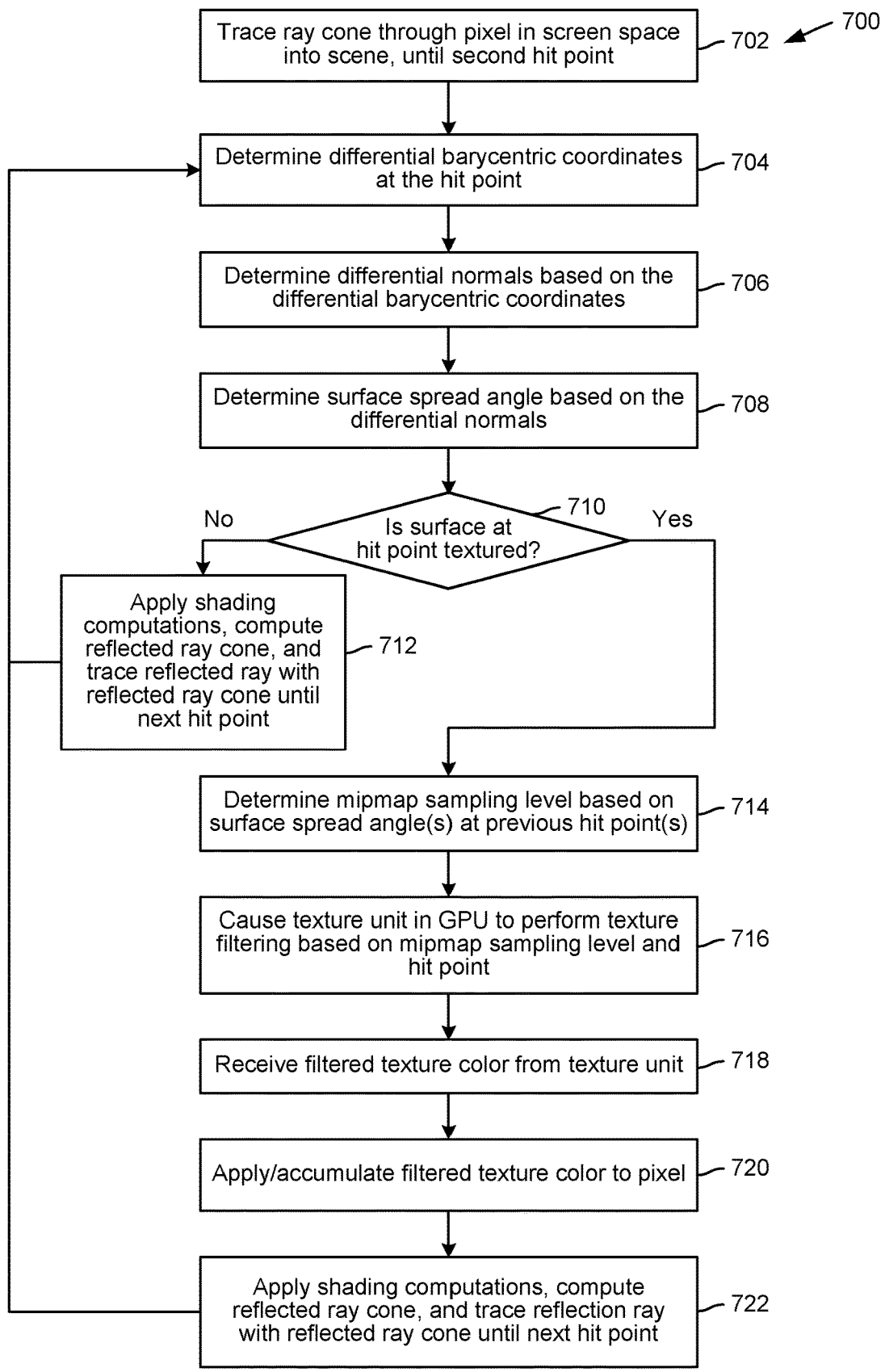
FIG. 7 is a flow diagram of method steps for computing the color of a pixel via a ray cone tracing technique, according to various embodiments.

FIG. 7 is a flow diagram of method steps for ray cone tracing, according to various embodiments. Although the method steps are described in conjunction with the systems of FIGS. 1-3, persons skilled in the art will understand that any system configured to perform the method steps in any order falls within the scope of the present embodiments. Although described with respect to tracing a single ray, the method steps can be repeated to trace multiple rays when rendering an image.

As shown, a method 700 begins at step 702, where the rendering application 130 traces a ray cone through a pixel in a screen space into a scene until a second hit point. The second hit point occurs after the ray cone hits and reflects off of geometry within the scene at a first hit point, and the reflected ray cone then hits geometry within the scene again at the second hit point. Step 702 assumes that such a second hit point exists. If there is no second hit point, then the method 700 ends.

At step 704, the rendering application 130 determines differential barycentric coordinates at the hit point. In some embodiments, the rendering application 130 determines differential barycentric coordinates based on plane equations according to equations (1)-(5).

At step 706, the rendering application 130 determines differential normals based on the differential barycentric coordinates. In some embodiments, the rendering application 130 determines differential normals according to equation (6).

At step 708, the rendering application 130 determines a surface spread angle based on the differential normals. In some embodiments, the rendering application 130 may determine the surface spread angle according to equation (9). In other embodiments, the rendering application 130 may determine the surface spread angle according to equation (10). In other embodiments, the rendering application 130 may determine the surface spread angle according to equation (11). In yet further embodiments, the rendering application 130 may determine the surface spread angle according to equation (12).

At step 710, if the surface at the hit point is not textured, then the method 700 continues to step 712, where the rendering application 130 applies shading computations, computes a reflected ray cone, and traces a reflected ray with the reflected ray cone until a next hit point. In some embodiments, the reflected ray cone may grow or shrink, depending on a surface spread angle that is determined in one of a number of ways based on differential normals, which are themselves computed based on differential barycentric coordinates at the hit point, as described above in conjunction with 6. Assuming a next hit point exists, the method 700 then returns to step 704, where the rendering application 130 determines differential barycentric coordinates at the next hit point.

On the other hand, if the rendering application 130 determines that the surface at the hit point is textured at step 710, then the method 700 proceeds directly to step 714, where the rendering application 130 determines a mipmap sampling level based on the surface spread angle(s) determined at previous hit point(s), which can be used to determine the width of the ray cone at a current hit point. In some embodiments, the rendering application 130 determines a mipmap sampling level parameter value $\lambda_i$ according to equations (13)-(15). In some embodiments, the rendering application 130 further handles multiple textures with different dimensions that are applied to a triangle by first computing part of the mipmap sampling level parameter value that is independent of texture resolution, and then computing the remainder of the mipmap sampling level parameter value based on the textures themselves, according to equations (16)-(17).

At step 716, the rendering application 130 causes the texture unit in a GPU (e.g., the texture unit 315 described above in conjunction with FIG. 3) to perform texture filtering based on the mipmap sampling level and a hit point. In some embodiments, the texture unit may perform trilinear mipmapping and sample the mipmap at the mipmap sampling level.

At step 718, the rendering application 130 receives a texture filter value from the texture unit, after the texture unit has performed the texture filtering based on the mipmap sampling level and the hit point.

At step 720, the rendering application 130 applies or accumulates the texture filter value to the pixel that the ray cone was traced through at step 702. The applied or accumulated texture filter value contributes to the color of the pixel in a rendered image. As described, the rendered image can be, e.g., an image or frame within a video game or film, an image generated by an architectural or design application or any other application, or the like.

Although described herein with respect to applying or accumulating the texture filter value to the pixel, in other embodiments, the texture filter value may be used in any technically feasible manner.

At step 722, the rendering application 130 applies shading computations, computes a reflected ray cone, and traces a reflection ray with the reflected ray cone until a next hit point. Similar to step 706, a rate at which the reflected ray cone grows or shrinks depends on the surface spread angle, determined at step 712. Assuming a next hit point exists, the method 700 returns to step 704, where the rendering application 130 determines differential barycentric coordinates at the next hit point.

In sum, the disclosed techniques avoid a separate G-buffer rasterizing pass during ray cone tracing by determining differential barycentric coordinates at a hit point, which are used to determine differential normals that are then used to determine surface spread angles which are used to compute a width of the ray cone, from which mipmap sampling levels can be determined and used to sample a mipmap during a texture filtering operation. Various techniques are disclosed for computing surface spread angles based on distinct angles computed for the x and y axes. In addition, techniques are disclosed for determining mipmap sampling level parameter values for multiple textures having different sizes by first computing part of a mipmap sampling level parameter value that is independent of resolution, and then computing the remainder of the mipmap sampling level parameter value based on the multiple textures.

At least one technological advantage of the disclosed techniques relative to the prior art is that differential normals used to determine a mipmap sampling level are determined without requiring a separate G-buffer rasterizing pass. As a result, the disclosed techniques are faster and require less storage space than conventional ray cone tracing techniques. Further, techniques are disclosed for determining surface spread angles that produce more correctly rendered images than surface spread angles determined using conventional techniques. In addition, the disclosed techniques permit mipmap sampling levels for multiple textures with different resolutions to be determined more efficiently than conventional ray cone tracing techniques. These technological advantages represent one or more technological advancements relative to prior art approaches.

1. In some embodiments, a computer-implemented method for computing a texture color comprises tracing a ray cone through a graphics scene, determining a curvature of a first surface within the graphics scene at a point where the ray cone hits the first surface based on differential barycentric coordinates associated with the point, determining, based on the curvature of the first surface, a width of the ray cone at a subsequent point where the ray cone hits a second surface within the graphics scene, and computing a texture color based on the width of the ray cone.

2. The computer-implemented method of clause 1, wherein the curvature of the first surface is determined by determining whether the absolute value of a first curvature associated with a first dimension is larger than the absolute value of a second curvature associated with a second dimension.

3. The computer-implemented method of clauses 1 or 2, wherein computing the texture color comprises determining a level-of-detail parameter value based on the width of the ray cone, and performing one or more texture filtering operations based on the level-of-detail parameter value.

4. The computer-implemented method of any of clauses 1-3, further comprising generating a rendered image, wherein generating the rendered image comprises applying or accumulating the texture color to a pixel in the rendered image.

5. The computer-implemented method of any of clauses 1-4, wherein the rendered image is one of an image or a frame associated with a video game, a film, or an architectural or design application.

6. In some embodiments, a computer-implemented method for computing a texture color comprises determining a set of differential barycentric coordinates associated with a hit point at which a ray cone intersects a first surface within a graphics scene, determining a first surface spread angle associated with the hit point based on the set of differential barycentric coordinates, determining, based on the first surface spread angle, a width of the ray cone at a subsequent hit point where the ray cone intersects a second surface within the graphics scene, determining a first level-of-detail parameter value based on the width of the ray cone, performing one or more texture filtering operations based on the first level-of-detail parameter value, and computing a texture color based on results of the one or more texture filtering operations.

7. The computer-implemented method of clause 6, wherein determining the first surface spread angle comprises determining a set of differential normals associated with the first surface at the hit point based on the set of differential barycentric coordinates, and determining the first surface spread angle based on the set of differential normals.

8. The computer-implemented method of clauses 6 or 7, wherein determining the first surface spread angle comprises determining a second surface spread angle associated with a first dimension and a third surface spread angle associated with a second dimension, and determining the first surface spread angle based on the second surface spread angle and the third surface spread angle.

9. The computer-implemented method of any of clauses 6-8, wherein determining the first surface spread angle comprises selecting one of the second surface spread angle or the third surface spread angle that has a larger absolute value.

10. The computer-implemented method of any of clauses 6-9, wherein the first surface spread angle is determined by determining an average of the second surface spread angle and the third surface spread angle.

11. The computer-implemented method of any of clauses 6-10, wherein determining the first surface spread angle based on the second surface spread angle and the third surface spread angle comprises selecting the larger of the second surface spread angle and the third surface spread angle if the second surface spread angle and the third surface spread angle are both positive angles, selecting the smaller of the second surface spread angle and the third surface spread angle if the second surface spread angle and the third surface spread angle are both negative angles, or determining a sum of the second surface spread angle and the third surface spread angle if only one of the second surface spread angle or the third surface spread angle is a positive angle.

12. The computer-implemented method of any of clauses 6-11, wherein determining the first surface spread angle based on the second surface spread angle and the third surface spread angle comprises determining a product of a term and a sign of the second surface spread angle if an absolute value of the second surface spread angle is greater than an absolute value of the third surface spread angle, or determining a product of the term and a sign of the third surface spread angle if the absolute value of the third surface spread angle is greater than the absolute value of the second surface spread angle, wherein the term equals a product of two and a sum of a square root of the second surface spread angle squared and the third surface spread angle squared.

13. The computer-implemented method of any of clauses 6-12, wherein the second surface is associated with a plurality of textures having different resolutions, and determining the first level-of-detail parameter comprises, determining a second level-of-detail parameter value that is independent of texture resolution, and determining the first level-of-detail parameter value based on the second second-level-of-detail parameter value.

14. In some embodiments, one or more non-transitory computer-readable media storing program instructions that, when executed by at least one processor, cause the at least one processor to perform the steps of determining a set of differential barycentric coordinates associated with a hit point at which a ray cone intersects a first surface within a graphics scene, determining a first surface spread angle associated with the hit point based on the set of differential barycentric coordinates, determining, based on the first surface spread angle, a width of the ray cone at a subsequent hit point where the ray cone intersects a second surface within the graphics scene, determining a first level-of-detail parameter value based on the width of the ray cone, performing one or more texture filtering operations based on the first level-of-detail parameter value, and computing a texture color based on results of the one or more texture filtering operations.

15. The one or more non-transitory computer-readable media of clause 14, wherein the at least one processor includes a graphics processing unit (GPU), and the one or more texture filtering operations are performed via a texture unit included in the GPU.

16. The one or more non-transitory computer-readable media of clauses 14 or 15, wherein determining the first surface spread angle comprises determining a set of differential normals associated with the first surface at the hit point based on the set of differential barycentric coordinates, and determining the first surface spread angle based on the set of differential normals.

17. The one or more non-transitory computer-readable media of any of clauses 14-16, wherein determining the first surface spread angle comprises determining a second surface spread angle associated with a first dimension and a third surface spread angle associated with a second dimension, and selecting one of the second surface spread angle or the third surface spread angle that has a larger absolute value.

18. The one or more non-transitory computer-readable media of any of clauses 14-17, wherein determining the first surface spread angle comprises determining a second surface spread angle associated with a first dimension and a third surface spread angle associated with a second dimension, and determining an average of the second surface spread angle and the third surface spread angle.

19. The one or more non-transitory computer-readable media of any of clauses 14-18, wherein determining the first surface spread angle comprises determining a second surface spread angle associated with a first dimension and a third surface spread angle associated with a second dimension, selecting the larger of the second surface spread angle and the third surface spread angle if the second surface spread angle and the third surface spread angle are both positive angles, selecting the smaller of the second surface spread angle and the third surface spread angle if the second surface spread angle and the third surface spread angle are both negative angles, or determining a sum of the second surface spread angle and the third surface spread angle if only one of the second surface spread angle or the third surface spread angle is a positive angle.

20. The one or more non-transitory computer-readable media of any of clauses 14-19, wherein determining the first surface spread angle comprises determining a second surface spread angle associated with a first dimension and a third surface spread angle associated with a second dimension, determining a product of a term and a sign of the second surface spread angle if an absolute value of the second surface spread angle is greater than an absolute value of the third surface spread angle, or determining a product of the term and a sign of the third surface spread angle if the absolute value of the third surface spread angle is greater than the absolute value of the second surface spread angle, wherein the term equals a product of two and a sum of a square root of the second surface spread angle squared and the third surface spread angle squared.

21. The one or more non-transitory computer-readable media of any of clauses 14-20, wherein the second surface is associated with a plurality of textures having different resolutions, and determining the first level-of-detail parameter comprises, determining a second level-of-detail parameter value that is independent of texture resolution, and determining the first level-of-detail parameter value based on the second second-level-of-detail parameter value.

22. The one or more non-transitory computer-readable media of any of clauses 14-21, wherein the first level-of-detail parameter value indicates a mipmap sampling level.

23. In some embodiments, a system comprises one or more memories storing instructions, and one or more processors that are coupled to the one or more memories and, when executing the instructions, are configured to determine a set of differential barycentric coordinates associated with a hit point at which a ray cone intersects a first surface within a graphics scene, determine a first surface spread angle associated with the hit point based on the set of differential barycentric coordinates, determine, based on the first surface spread angle, a width of the ray cone at a subsequent hit point where the ray cone intersects a second surface within the graphics scene, determine a first level-of-detail parameter value based on the width of the ray cone, perform one or more texture filtering operations based on the first level-of-detail parameter value, and compute a texture color based on results of the one or more texture filtering operations.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for computing a texture color, the method comprising:
   determining a surface spread angle at a first point where a ray cone intersects a first surface within a graphics scene based on one or more differential barycentric coordinates at the first point;
   determining, based on the surface spread angle, a width of a reflected ray cone at a second point where the reflected ray cone intersects a second surface within the graphics scene; and
   computing the texture color based on the width of the reflected ray cone.

2. The computer-implemented method of claim 1, wherein computing the texture color comprises:
   determining a size of a filter based on the width of the reflected ray cone; and
   performing one or more texture filtering operations based on the size of the filter.

3. The computer-implemented method of claim 2, wherein the one or more texture filtering operations include at least one mipmapping operation or anisotropic filtering operation.

4. The computer-implemented method of claim 1, wherein computing the texture color comprises:
   determining a mipmap sampling level based on the width of the reflected ray cone; and
   performing one or more mipmapping operations based on the mipmap sampling level.

5. The computer-implemented method of claim 1, wherein determining the surface spread angle comprises:
   determining one or more differential normals associated with the first surface at the first point based on the one or more differential barycentric coordinates; and
   determining the surface spread angle based on the one or more differential normals.

6. The computer-implemented method of claim 1, wherein determining the surface spread angle comprises:
   determining a first differential normal and a second differential normal based on the one or more differential barycentric coordinates;
   determining a first surface spread angle associated with a first dimension based on the first differential normal;
   determining a second surface spread angle associated with a second dimension based on the second differential normal; and
   determining the surface spread angle based on the first surface spread angle and the second surface spread angle.

7. The computer-implemented method of claim 6, wherein determining the surface spread angle comprises selecting one of the first surface spread angle or the second surface spread angle that has a larger absolute value.

8. The computer-implemented method of claim 6, wherein determining the surface spread angle comprises computing an average of the first surface spread angle and the second surface spread angle.

9. The computer-implemented method of claim 6, wherein determining the surface spread angle comprises:
   selecting a larger of the first surface spread angle and the second surface spread angle if the first surface spread angle and the second surface spread angle are both positive angles;
   selecting a smaller of the first surface spread angle and the second surface spread angle if the first surface spread angle and the second surface spread angle are both negative angles; or
   computing a sum of the first surface spread angle and the second surface spread angle if only one of the first surface spread angle and the second surface spread angle is a positive angle.

10. The computer-implemented method of claim 6, wherein determining the surface spread angle comprises:
    determining a product of a term and a sign of the first surface spread angle if an absolute value of the first surface spread angle is greater than an absolute value of the second surface spread angle; or
    determining a product of the term and a sign of the second surface spread angle if the absolute value of the second surface spread angle is greater than the absolute value of the first surface spread angle,
    wherein the term equals a product of two and a sum of a square root of the first surface spread angle squared and the second surface spread angle squared.

11. One or more non-transitory computer-readable storage media including instructions that, when executed by at least one processor, cause the at least one processor to perform steps for computing a texture color, the steps comprising:
    determining a surface spread angle at a first point where a ray cone intersects a first surface within a graphics scene based on one or more differential barycentric coordinates at the first point;
    determining, based on the surface spread angle, a width of a reflected ray cone at a second point where the reflected ray cone intersects a second surface within the graphics scene; and
    computing the texture color based on the width of the reflected ray cone.

12. The one or more non-transitory computer-readable storage media of claim 11, wherein computing the texture color comprises:
    determining a size of a filter based on the width of the reflected ray cone; and
    performing one or more texture filtering operations based on the size of the filter.

13. The one or more non-transitory computer-readable storage media of claim 11, wherein computing the texture color comprises:
    determining a level-of-detail parameter value based on the width of the reflected ray cone; and performing one or more texture filtering operations based on the level-of-detail parameter value; and computing the texture color based on results of the one or more texture filtering operations.

14. The one or more non-transitory computer-readable storage media of claim 11, wherein the level-of-detail parameter value indicates a mipmap sampling level.

15. The one or more non-transitory computer-readable storage media of claim 11, wherein the at least one processor includes a graphics processing unit (GPU), and the texture color is computed via a texture unit included in the GPU.

16. The one or more non-transitory computer-readable storage media of claim 11, wherein determining the surface spread angle comprises:
    determining one or more differential normals associated with the first surface at the first point based on the one or more differential barycentric coordinates; and
    determining the surface spread angle based on the one or more differential normals.

17. The one or more non-transitory computer-readable storage media of claim 11, wherein determining the surface spread angle comprises selecting one of a first surface spread angle associated with a first dimension or a second surface spread angle associated with a second dimension that has a larger absolute value.

18. The one or more non-transitory computer-readable storage media of claim 11, wherein determining the surface spread angle comprises computing an average of a first surface spread angle associated with a first dimension and a second surface spread angle associated with a second dimension.

19. The one or more non-transitory computer-readable storage media of claim 11, wherein determining the surface spread angle comprises:
    selecting a larger of a first surface spread angle associated with a first dimension and a second surface spread angle associated with a second dimension if the first surface spread angle and the second surface spread angle are both positive angles;
    selecting a smaller of the first surface spread angle and the second surface spread angle if the first surface spread angle and the second surface spread angle are both negative angles; or
    computing a sum of the first surface spread angle and the second surface spread angle if only one of the first surface spread angle and the second surface spread angle is a positive angle.

20. A system, comprising:
    one or more memories storing instructions; and
    one or more processors that are coupled to the one or more memories and, when executing the instructions, are configured to:
        determine a surface spread angle at a first point where a ray cone intersects a first surface within a graphics scene based on one or more differential barycentric coordinates at the first point,
        determine, based on the surface spread angle, a width of a reflected ray cone at a second point where the reflected ray cone intersects a second surface within the graphics scene, and
        compute a texture color based on the width of the reflected ray cone.

\* \* \* \* \*